(12) United States Patent  
Wei (10) Patent No.: US 6,977,485 B1  
(45) Date of Patent: Dec. 20, 2005

(54) BATTERY CHARGING AND/OR DC POWER SUPPLY CIRCUITRY

(75) Inventor: Chen-Ku Wei, Nantou (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 0 days.

(21) Appl. No.: 11/003,464

(22) Filed: Dec. 6, 2004

(30) Foreign Application Priority Data

Sep. 3, 2004 (TW) .............................. 93126814 A (51) Int. Cl.[7] .............................................. H02J 7/04

(52) U.S. Cl. ................................................... 320/139

(58) Field of Search ............................. 320/139, 141, 320/159, 160; 322/6; 363/76; 307/10.1

(56) References Cited

U.S. PATENT DOCUMENTS 3,590,358 A * 6/1971 Ruben ......................... 320/141  
6,114,775 A * 9/2000 Chung et al. ............... 307/10.1

* cited by examiner

*Primary Examiner*—Pia Tibbits  
(74) *Attorney, Agent, or Firm*—Bacon & Thomas, PLLC (57) ABSTRACT

A battery charging and/or DC power supply circuitry employs a control circuit through an SCR drive circuit and an MOS drive circuit to control when to turn on/off a semiconductor switch unit and to turn on the semiconductor switch unit while an initial section of each positive half wave of an AC power source and an terminating section of the same are located below a predetermined level for intercepting partial power for charging. While charging a battery, the circuitry is lightweight, small-sized, and to enhance the life of the battery. While being a DC power supply, the circuitry is small-sized, high-efficiency, and low-cost.

10 Claims, 7 Drawing Sheets

BATTERY CHARGING AND/OR DC POWER SUPPLY CIRCUITRY

BACKGROUND OF THE INVENTION

1. Field of the Invention

The present invention relates generally to electronic devices, and more particularly to a battery charging and/or DC power supply circuitry.

2. Description of the Related Art

A conventional battery charger normally employs a high-cost, huge, and heavy transformer for stepping down the alternate current (AC) line voltage to get charging current for charging the battery. However, such battery charger is too heavy to be conveniently portable due to the heavy transformer.

Figure 7:
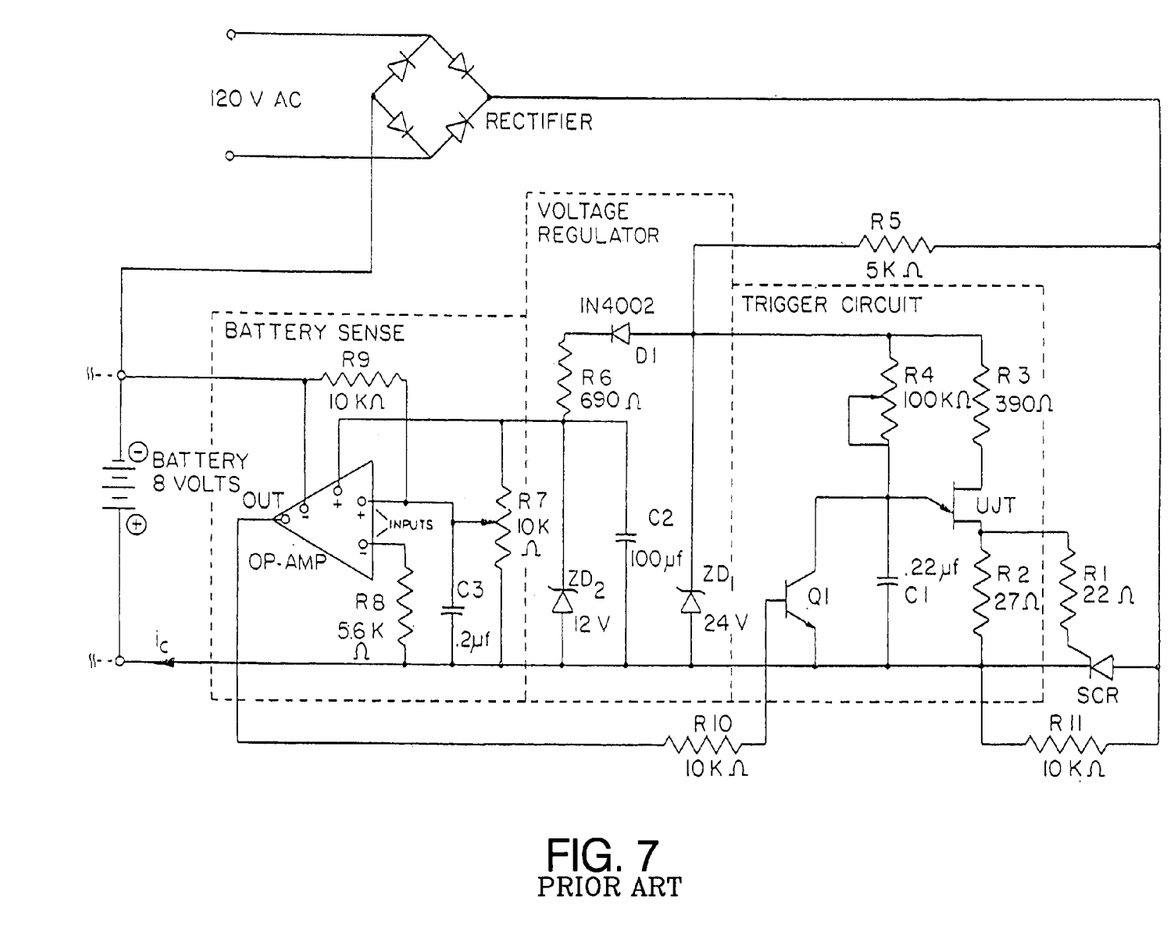
FIG. 7 illustrates the conventional pulse charging circuitry.

A transformerless pulse battery charging circuitry was developed to eliminate the drawback of the aforementioned conventional battery charger. As shown in FIG. 7, a conventional pulse battery charging circuitry primarily employs a control circuit to intercept the low voltage from a negative-slope side of the AC power and the employs the low voltage as a charging power source to charge the battery. However, since the silicon controlled rectifier (SCR) fails to be turned off by the gate terminal once triggered, while encountering the condition of unstable AC power, like power phase deviation is occurred in the power supply of the power plant, or the power plug is in imperfect contact with the socket, the voltage level of the AC power tends to rise immediately before it drops to the cutoff level of the SCR to cause excessively heavy current to further burn the circuitry because the SCR fails to be turned off in time.

Further, the conventional direct current (DC) charging technology tends to crystallize the battery plate over a long time. After the crystallization, the reaction area of the plate is decreased and the output/input impedance is increased to further incur the aging of the battery. The aged battery tends to generate a virtual voltage while being charged to cause its undercharge, thereby incurring the short life of the battery.

SUMMARY OF THE INVENTION

The primary objective of the present invention is to provide an improved battery charging and/or DC power supply circuitry, which avoids not only the huge size and the heavyweight of the conventional battery charger with the transformer but also the circuitry burnout incurred by the prior pulse charging art to further cause the failure of merchandization thereof.

The secondary objective of the present invention is to provide an improved battery charging and/or DC power supply circuitry, which not only reduces the crystallization of the battery plates but also eliminates any of the virtual voltage while charging the battery.

The foregoing objectives of the present invention are attained by the improved battery charging and/or DC power supply circuitry, which is comprised of a rectifier unit, a control circuit, a semiconductor switch unit, a metal-oxide-semiconductor (MOS) switch drive circuit, a level-limiting circuit, an SCR drive circuit. The rectifier unit is electrically connected with an AC power source for rectifying a positive full wave to a plurality of positive half waves. The control circuit is provided for predetermined calculation and control. The semiconductor switch unit includes an SCR serially connected with an input terminal of an MOS switch and electrically connected with the rectifier unit. The MOS switch drive circuit is electrically connected with a control terminal of the MOS switch and the control circuit for switching on/off the MOS switch by the control circuit. The level-limiting circuit includes an OP comparator and a Zener diode. The OP comparator has two input terminals electrically connected with the rectifier unit and the Zener diode. The Zener diode is electrically connected with an output terminal of the MOS switch. The OP comparator has an output terminal electrically connected with the control circuit and the MOS switch drive circuit for limiting the predetermined voltage level of the MOS switch. The SCR drive circuit includes a pulse transformer and a transistor. The transistor is electrically connected with the control circuit and a first side of the pulse transformer. The pulse transformer has a second side electrically connected with a gate terminal of the SCR. While charging a rechargeable battery, the battery has a terminal electrically connected with the MOS switch and the other terminal grounded. The control circuit controls the MOS switch drive unit and the SCR drive circuit and further drives the semiconductor switch unit to turn on/off and the timing of charging to partially intercept charging current from the rectified positive half-wave AC power source for charging the battery. When the battery is changed to a capacitor, the present invention becomes a DC power supply.

DETAILED DESCRIPTION OF PREFERRED EMBODIMENTS

Figure 1:
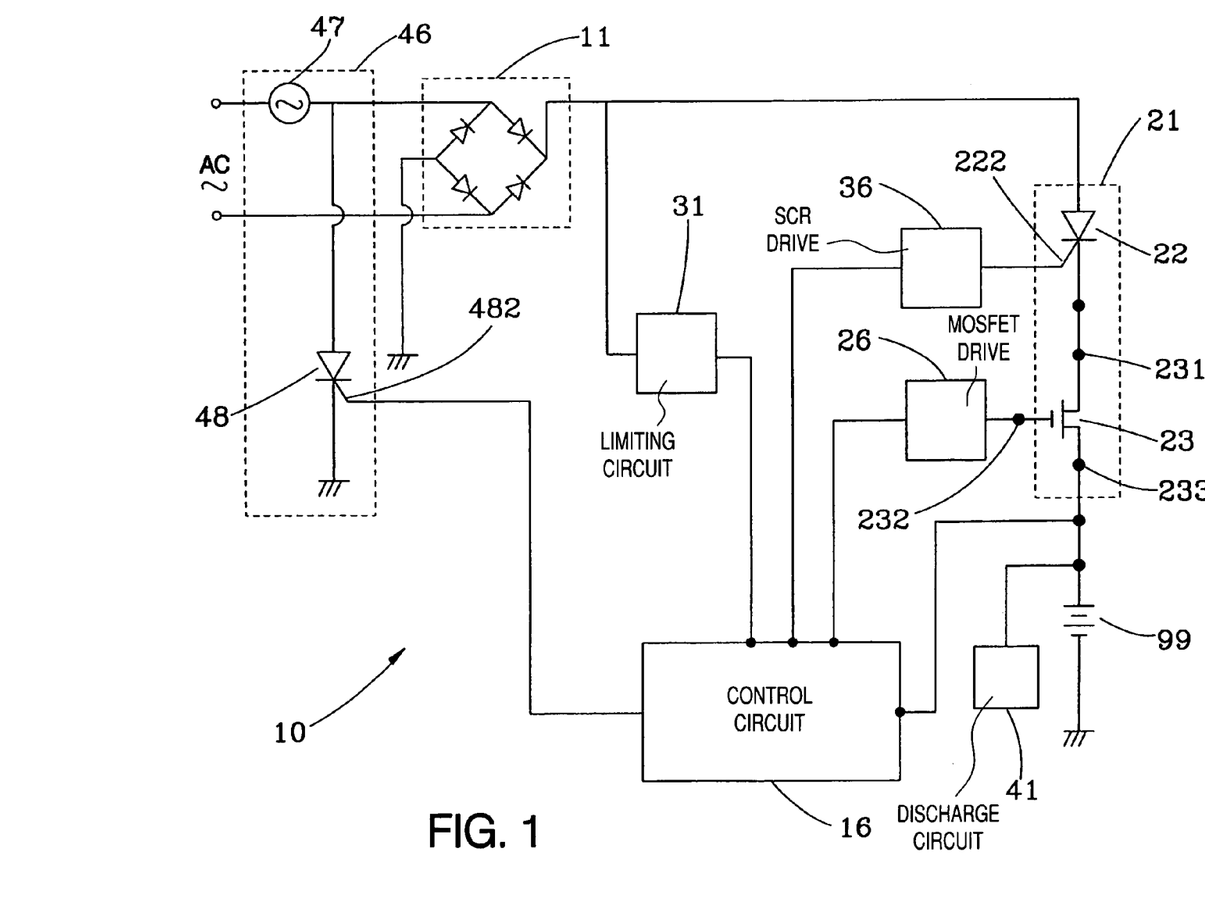
FIG. 1 is a block diagram of a first preferred embodiment of the present invention.
Figure 2:
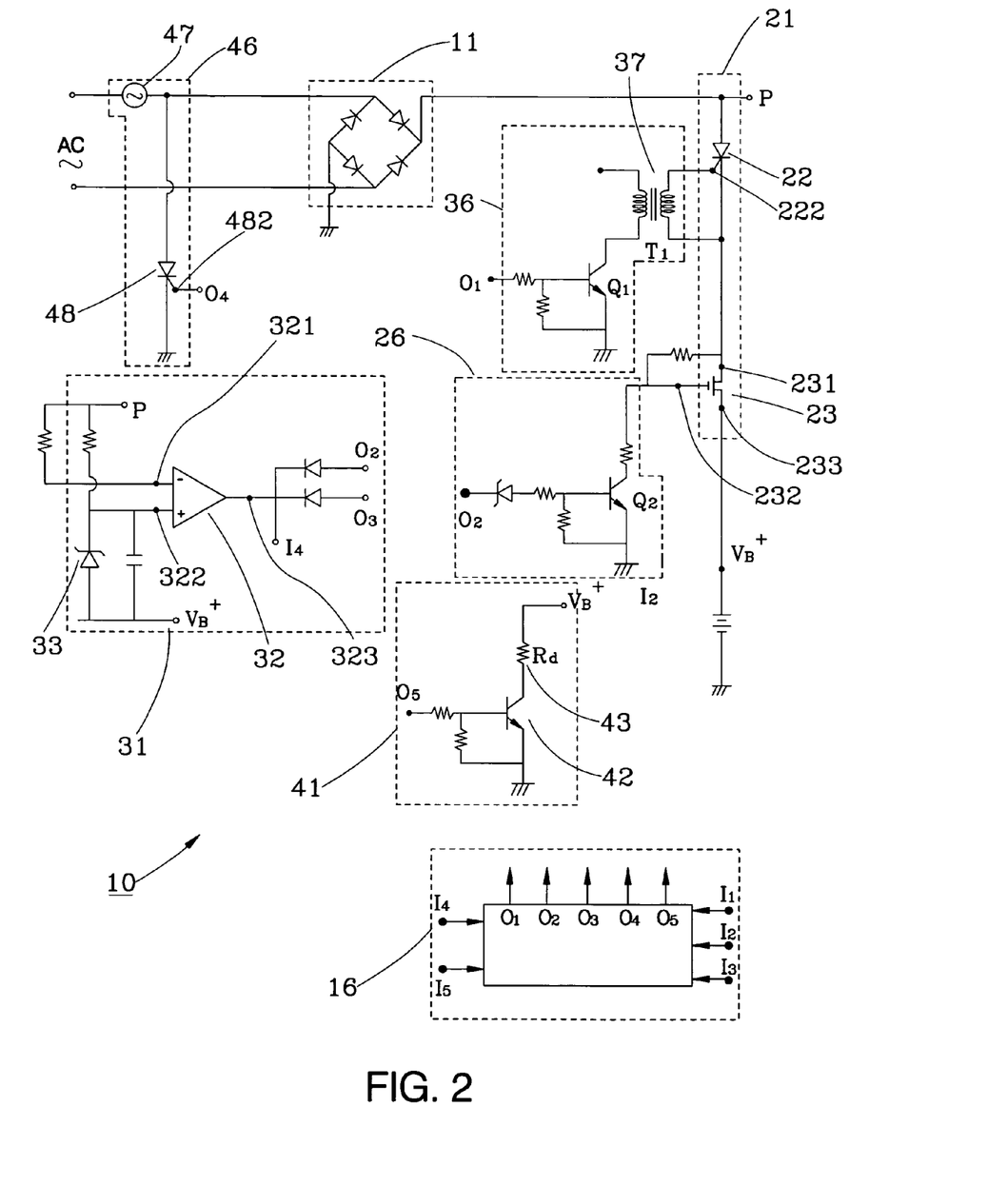
FIG. 2 illustrates a circuitry of the first preferred embodiment of the present invention.

Referring to FIGS. 1–2, a battery charging and/or DC power supply circuitry 10 constructed according to a first preferred embodiment of the present invention is comprised of a rectifier unit 11, a control circuit 16, a semiconductor switch unit 21, an MOS switch drive circuit 26, a level-limiting circuit 31, an SCR drive circuit 36, a discharging circuit 41, and a protection circuit 46.

The rectifier unit 11 is a bridging rectifier in this embodiment and electrically connected with an AC power source (not shown) for rectifying a positive full wave of the AC power source (not shown) to a plurality of positive half waves.

The control circuit 16 includes a microprocessor, which is a programmable single chip, for predetermined calculation and control.

The semiconductor switch unit 21 includes a first SCR 22 serially connected with an input terminal 231 of an MOS switch 23, which is a P channel metal-oxide-semiconductor field-effect transistor (MOSFET) or a bipolar power transistor in this embodiment. The first SCR 22 is electrically connected with the rectifier unit 11.

The MOS switch drive circuit 26 includes a transistor Q2 electrically connected with a control terminal 232 of the MOS switch 23 and the control circuit 16 for driving the MOS switch 23 to turn on/off by the control circuit 16.

The level-limiting circuit 31 includes an OP comparator 32 and a Zener diode 33. The OP comparator 32 has two input terminals 321 and 322 electrically connected with the rectifier unit 11 and a terminal of the Zener diode 33. The Zener diode 33 has the other terminal electrically connected with an output terminal 233 of the MOS switch 23. The OP comparator 32 has an output terminal 323 electrically connected with the control circuit 16 and the MOS switch drive circuit 26 for limiting predetermined voltage level of the MOS switch 23.

The SCR drive circuit 36 includes a pulse transformer 37 and a transistor Q1. The transistor Q1 is electrically connected with the control circuit 16 and a first side of the pulse transformer 37. The pulse transformer 37 has a second side electrically connected with a gate terminal 222 of the first SCR 22.

The discharging circuit 41 includes a transistor 42 and a plurality of resistors 43, being electrically connected with the output terminal 233 of the MOS switch 23 and the control circuit 16 to be controlled by the control circuit 16 to be of electrical conduction for discharging.

The protection circuit 46 includes a fuse 47 and a second SCR 48, being electrically connected between the AC power source (not shown) and the rectifier unit 11. The second SCR 48 has a gate terminal electrically connected with the control circuit 16.

Figure 3:
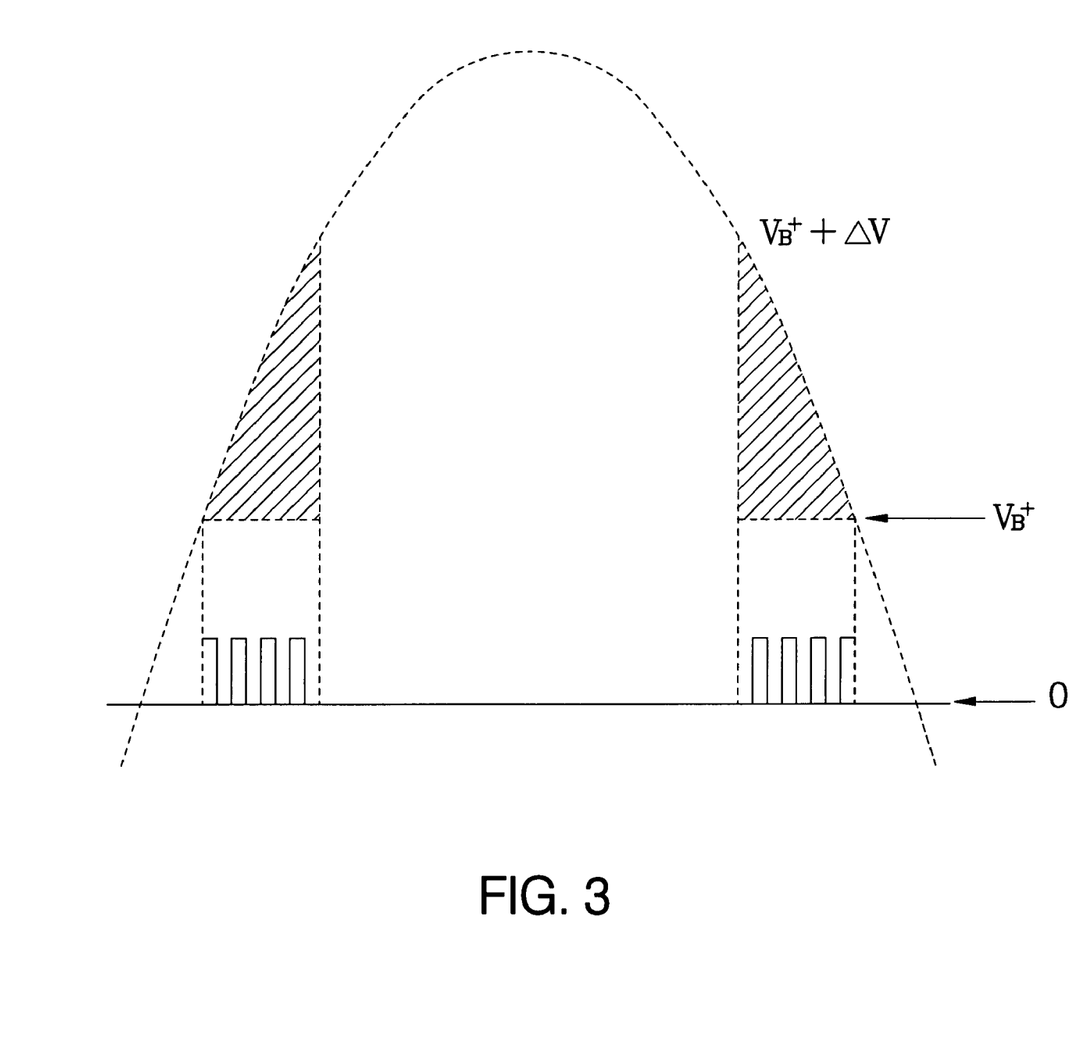
FIG. 3 illustrates a waveform of the AC power source employed in the first preferred embodiment of the present invention, showing that parts of the waveform are intercepted.

Referring to FIGS. 2 and 3, before operation, a rechargeable battery 99 is put into the present invention to enable that the battery 99 has its anode electrically connected with the output terminal 233 of the MOS switch 23 and its cathode electrically grounded. In operation, the control circuit 16 is operated to control when the semiconductor switch unit 21 is turned on/off through the SCR drive circuit 36 and the MOS switch drive circuit 26 and to control the semiconductor switch unit 21 to turn on while an initial section of each positive half wave of the AC power derived from AC power source (not shown) and an terminating section of the same are located below a predetermined level, for intercepting partial area of the initial and terminating sections of each positive half wave of the AC power for charging power source.

During the above operation, the control circuit 16 controls the transistor Q1 to be electrically conducted at the first side of the pulse transformer 37 and then an ionized voltage is sensed at the second side of the pulse transformer 37, such that the gate terminal of the first SCR 22 is driven for electrical conduction of the first SCR 22. The control circuit 16 controls the transistor Q2 to turn on the MOS switch 23. When the first SCR 22 is turned off, the AC power can be cut off. In the meantime, the level of requirement of withstand voltage for the MOS switch 23 is not so high, such that the MOS switch 23 can be provided with low voltage and heavy current to cause low production cost and high reliability.

Further, the reference voltage for the OP comparator 32 is the sum of the voltage $V_B$ of the battery plus the breakdown voltage $\Delta V$ of the Zener diode 33, i.e. $V_B+\Delta V$. When the voltage level of the AC power is greater than the reference voltage, the OP comparator 32 outputs LOW to further forcibly turn off the transistor Q2. In other words, when the voltage level of the AC power is greater than the reference voltage, the MOS switch 23 is forcibly turned off to prevent the power source, which voltage is higher than the reference one, from charging the battery 99.

The discharging circuit 41 is controlled by the control circuit 16 to discharge while no charging is rendered in each half wave of the AC power, thereby preventing the battery 99 not only from increasing impedance resulted from the crystallization of the battery plate but also from increasing temperature to further enhance the life of the battery 99.

The protection circuit 46 is controlled to turn on the second SCR 48 and to burn the fuse 47 to further cut off the AC power while the control circuit 16 has commanded to stop charging but still detects charging current, thereby preventing the battery 99 from overcharge, which may cause explosion.

Figure 4:
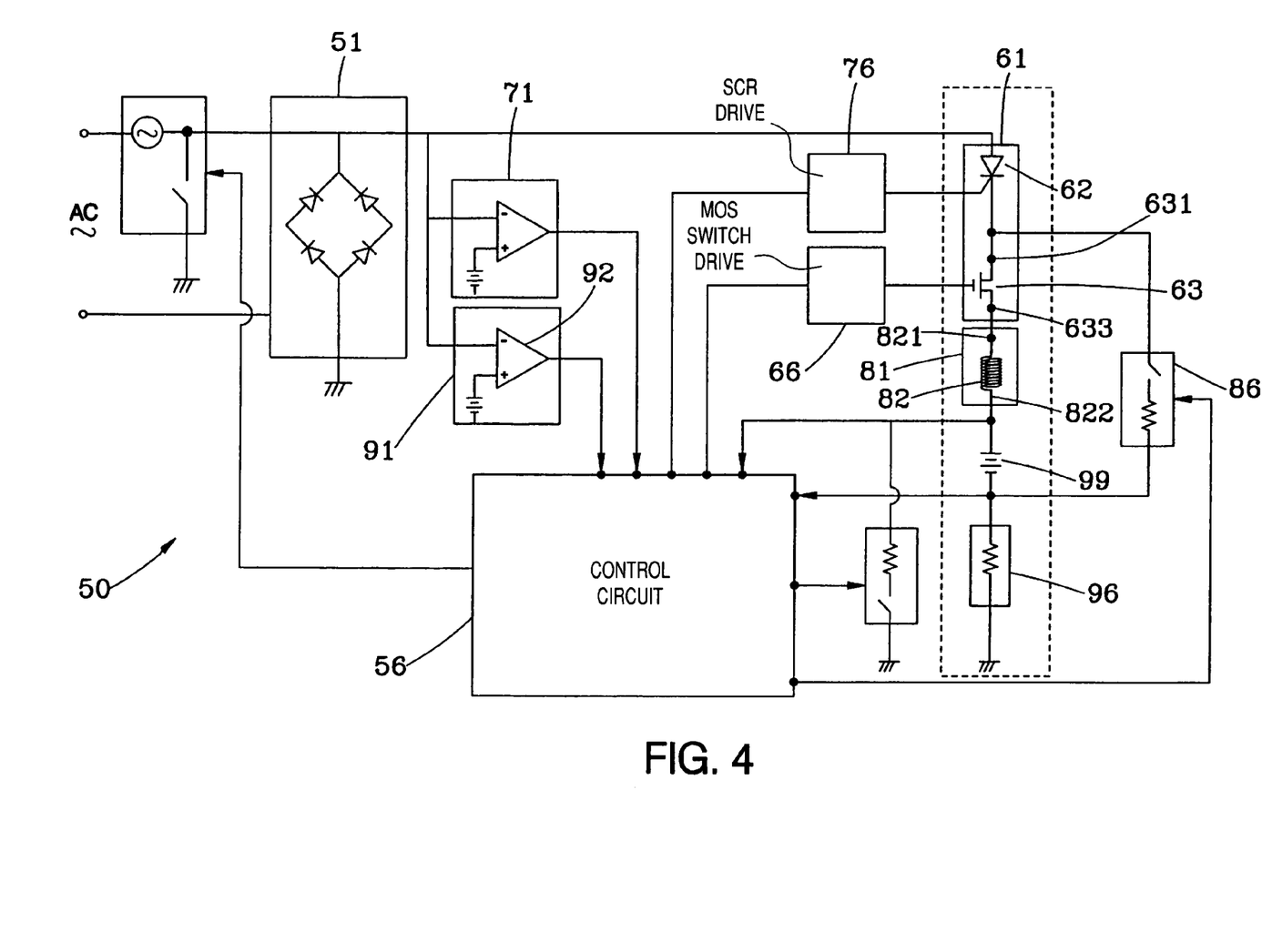
FIG. 4 is a block diagram of a second preferred embodiment of the present invention.
Figure 5:
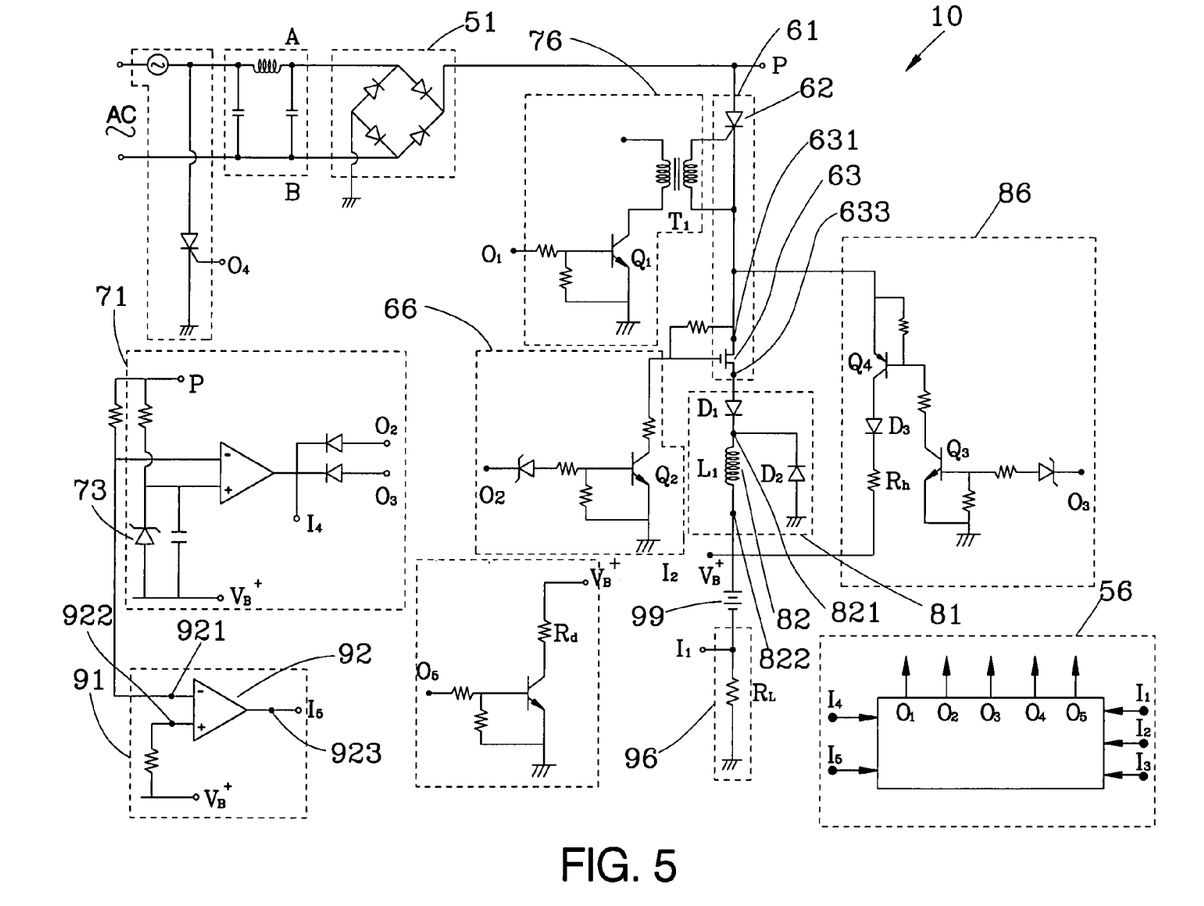
FIG. 5 illustrates a circuitry of the second preferred embodiment of the present invention.

Referring to FIGS. 4–5, a battery charging and/or DC power supply circuitry 50 constructed according to a second preferred embodiment of the present invention is comprised of a rectifier unit 51, a control circuit 56, a semiconductor switch unit 61, an MOS switch drive circuit 66, a level-limiting circuit 71, an SCR drive circuit 76, a step-down circuit 81, an SCR maintenance circuit 86, a timing sensing circuit 91, and a current sensor 96.

The rectifier unit 51, the control circuit 56, the semiconductor switch unit 61, the MOS switch drive circuit 66, the level-limiting circuit 71, and the SCR drive circuit 76 are structurally and functionally identical to those of the aforementioned embodiment, and thus, no further recitation is necessary.

The step-down circuit 81 includes an inductor 82 and two diodes D1 and D2. The inductor 82 has a first terminal 821 electrically connected with the output terminal 633 of the MOS switch 63 through the diode D1 and then electrically grounded through the diode D2, and a second terminal 822 electrically connected with the battery 99.

The SCR maintenance circuit 86 includes two transistors Q3 and Q4 bridged over the input terminal 631 of the MOS switch 63 and the step-down circuit 81 and electrically connected with the control circuit 56, being controlled for maintaining the electrical conduction of the SCR 62 as required.

The timing sensing circuit 91 includes a second OP comparator 92, which has two input terminals 921 and 922 electrically connected with the rectifier 51 and the step-down circuit 81, and an output terminal 923 electrically connected with the control circuit 56.

The current sensor 96 is a resistor in this embodiment, having a terminal electrically grounded.

Before operation, a rechargeable battery 99 is put into the battery charging and/or DC power supply circuitry 50 to enable that the battery 99 has its anode electrically connected with the second terminal 822 of the inductor 82 and its cathode electrically connected with the current sensor 96. The rectifier unit 51, the control circuit 56, the semiconductor switch unit 61, the MOS switch drive circuit 66, and the level-limiting circuit 71 are identical in operation to those of the aforementioned embodiment, and thus, no further recitation is necessary.

The step-down circuit 81 employs the MOS switch (MOSFET) together with the inductor 82 to generate voltage step-down effect. While detecting the charging current and the level of the AC power, the control circuit 56 controls the MOS switch 63 to be turned on by pulse width moderation (PWM) to stabilize the charging current much more to enable the current to be more easily detected and controlled. The SCR maintenance circuit 86 is employed to prevent the SCR 62 from being turned off due to the cutoff resulted from turning off the MOS switch 63 while the MOS switch 63 is turned on by PWM after the SCR 62 is electrically conducted by pulse, and to keep the current flowing through the SCR 62 heavier than holding current, which is not heavy actually, further maintaining the electrical conduction of the SCR 62. When the AC power is greater than the maximum level of the aforementioned intercepted partial power, the control circuit 56 controls the SCR 62 to maintain cutoff of the circuit 86.

The timing sensing circuit 91 is similar in operation to the level-limiting circuit 71, employing the second OP comparator 92 to compare the level between the battery 99 and the AC power to detect the timing of the AC power and to enable the control circuit 56 to assess where to intercept the partial power of the AC power source (not shown) corresponding to the timing of the level of the battery 99.

Figure 6:
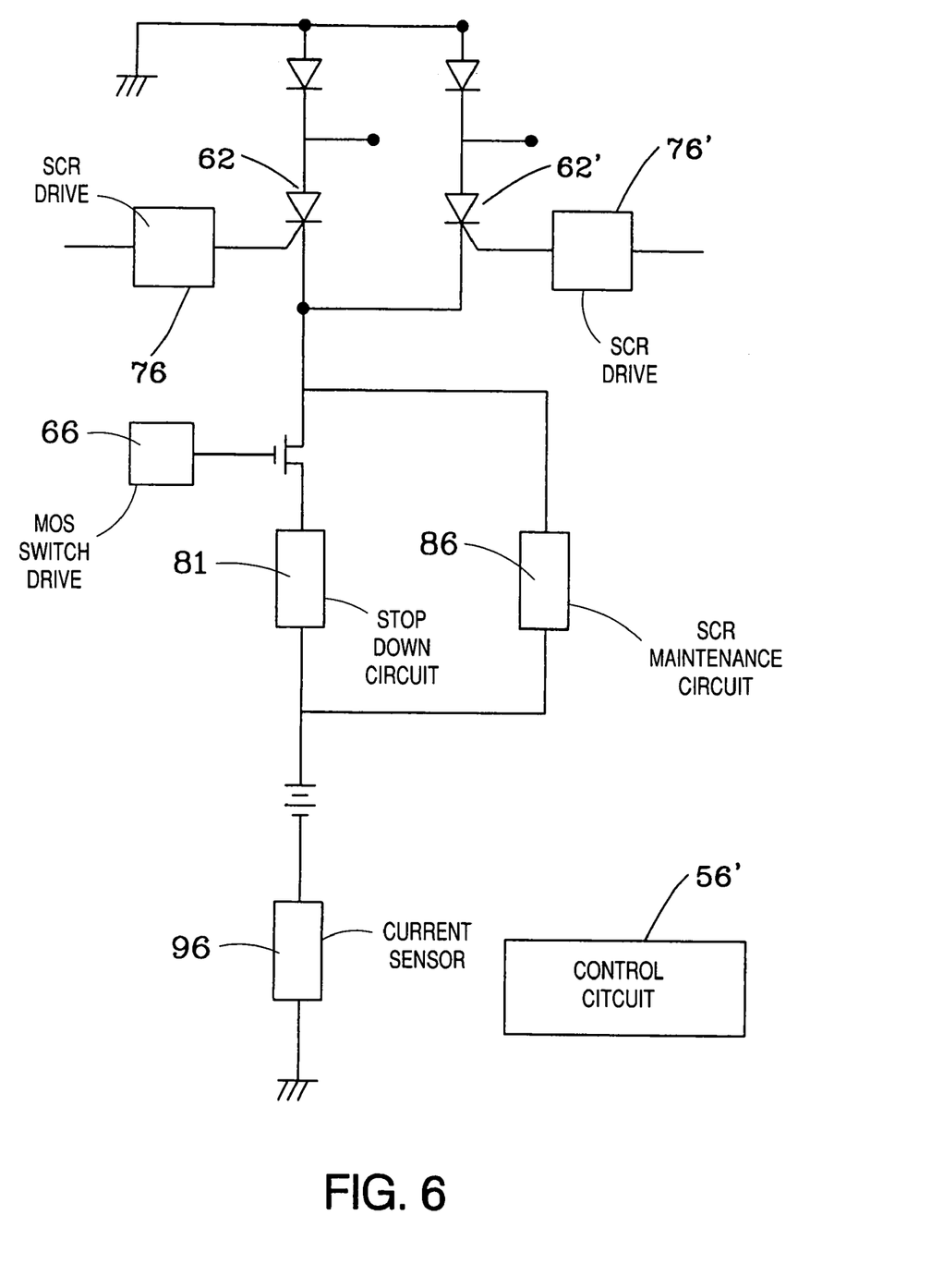
FIG. 6 is another block diagram of the second preferred embodiment of the present invention, showing that the two semiconductor switch units are connected in parallel.

Referring to FIG. 6, the battery charging and/or DC power supply circuitry 50 can alternatively includes a third SCR 62' and an SCR drive circuit 76'. The third SCR 62' is connected in parallel with the SCR 62. The SCR drive circuit 76' is electrically connected with the control circuit 56 to be controlled by the control circuit 56 to process single/dual positive half-wave power source and further distribute the heat generated.

In the above-mentioned two embodiments, the battery 99 can be replaced by a capacitor to enable the present invention to be an AC to DC power supply.

What is claimed is:

1. A battery charging and/or DC power supply circuitry comprising:
   a rectifier unit electrically connected with an AC power source for rectifying a positive full wave of said AC power source to a plurality of positive half waves;
   a control circuit having a microprocessor for predetermined calculation and control;
   a semiconductor switch unit having an SCR serially connected with an input terminal of an MOS switch and electrically connected with said rectifier unit;
   an MOS switch drive circuit electrically connected with a control terminal of said MOS switch and said control circuit for being controlled by said control circuit to turn on/off said MOS switch;
   a level-limiting circuit having an OP comparator and a Zener diode, said OP comparator having two input terminals electrically connected with said rectifier unit and said Zener diode, said Zener diode being electrically connected with an output terminal of said MOS switch, said OP comparator having an output terminal electrically connected with said control circuit and said MOS switch drive circuit for limiting a predetermined voltage level of said MOS switch; and
   an SCR drive circuit having a pulse transformer and a transistor, said transistor electrically connected with said control circuit and a first side of said pulse transformer, said pulse transformer having a second side electrically connected with a gate terminal of said SCR;
   wherein a battery can be electrically connected with said circuitry by its one terminal electrically connected with said MOS switch and the other terminal electrically grounded, and then said control circuit controls said MOS switch drive unit and said SCR drive circuit to further drive said semiconductor switch unit to be turned on/off and timing of charging to intercept charging current from said rectified positive half-wave power source for charging said battery.

2. The circuitry as defined in claim 1 further comprising a discharging circuit, said discharging circuit having a transistor and a plurality of resistors and electrically connected with an output terminal of said MOS switch and said control circuit for being controlled by said control circuit to be of electrical conduction for discharging.

3. The circuitry as defined in claim 1, wherein said rectifier unit is a bridging rectifier.

4. The circuitry as defined in claim 1, wherein said MOS switch is an MOSFET or a bipolar power transistor.

5. The circuitry as defined in claim 1, wherein said microprocessor comprises a programmable single chip.

6. The circuitry as defined in claim 1 further comprising a capacitor, said capacitor having a terminal electrically connected with said MOS switch and the other terminal electrically grounded to enable said circuitry to become a DC power supply.

7. A battery charging and/or DC power supply circuitry comprising:
   a rectifier unit electrically connected with an AC power source for rectifying a positive full wave of said AC power source to a plurality of positive half waves;
   a control circuit having a microprocessor for predetermined calculation and control;
   a semiconductor switch unit having an SCR serially connected with an input terminal of an MOS switch and electrically connected with said rectifier unit;
   an MOS switch drive circuit electrically connected with a control terminal of said MOS switch and said control circuit for being controlled by said control circuit to turn on/off said MOS switch;
   a step-down circuit having an inductor and two diodes, said inductor having a terminal electrically connected with an output terminal of said MOS switch;
   a level-limiting circuit having an OP comparator and a Zener diode, said OP comparator having two input terminals electrically connected with said rectifier unit and said Zener diode, said Zener diode being electrically connected with the other terminal of said inductor of said step-down circuit, said OP comparator having an output terminal electrically connected with said control circuit and said MOS switch drive circuit for a limiting predetermined voltage level of said MOS switch;
   an SCR drive circuit having a pulse transformer and a transistor, said transistor electrically connected with said control circuit and a first side of said pulse transformer, said pulse transformer having a second side electrically connected with a gate terminal of said SCR;
   an SCR maintenance circuit having two transistors Q3 and Q4, said SCR maintenance circuit being bridged over said input terminal of said MOS switch and said step-down circuit and electrically connected with said control circuit for being controlled to maintain electrical conduction of said SCR;
   a timing sensing circuit having a second OP comparator, said second OP comparator having two input terminals electrically connected with said rectifier unit and said step-down circuit and an output terminal electrically connected with said control circuit; and
   a current sensor;
   wherein a battery can be electrically connected with said circuitry by its one terminal electrically connected with said step-down circuit and the other terminal electrically connected with said current sensor, and then said control circuit controls said MOS switch drive unit and said SCR drive circuit to further drive said semiconductor switch unit to be turned on/off and timing of charging to intercept charging current from said rectified positive half-wave power source for charging said battery; said battery can be replaced by a capacitor, whereby said circuitry becomes a DC power supply.

8. The circuitry as defined in claim 7 further comprising a protection circuit, said protection circuit having a fuse and a second SCR and electrically connected between said AC power source and said rectifier unit, said second SCR having a gate terminal electrically connected with said control circuit.

9. The circuitry as defined in claim 7 further comprising a third SCR and a second SCR drive circuit for respectively processing said single/dual positive half-wave AC power source, said third SCR being connected in parallel with said SCR of said semiconductor switch unit, said second SCR drive circuit being electrically connected with said control circuit.

10. The circuitry as defined in claim 7, wherein said current inductor is a resistor.

* * * * *